April 15, 1941.  A. H. BURKEMAN  2,238,578
AUGER SAW
Filed March 6, 1940  2 Sheets-Sheet 1
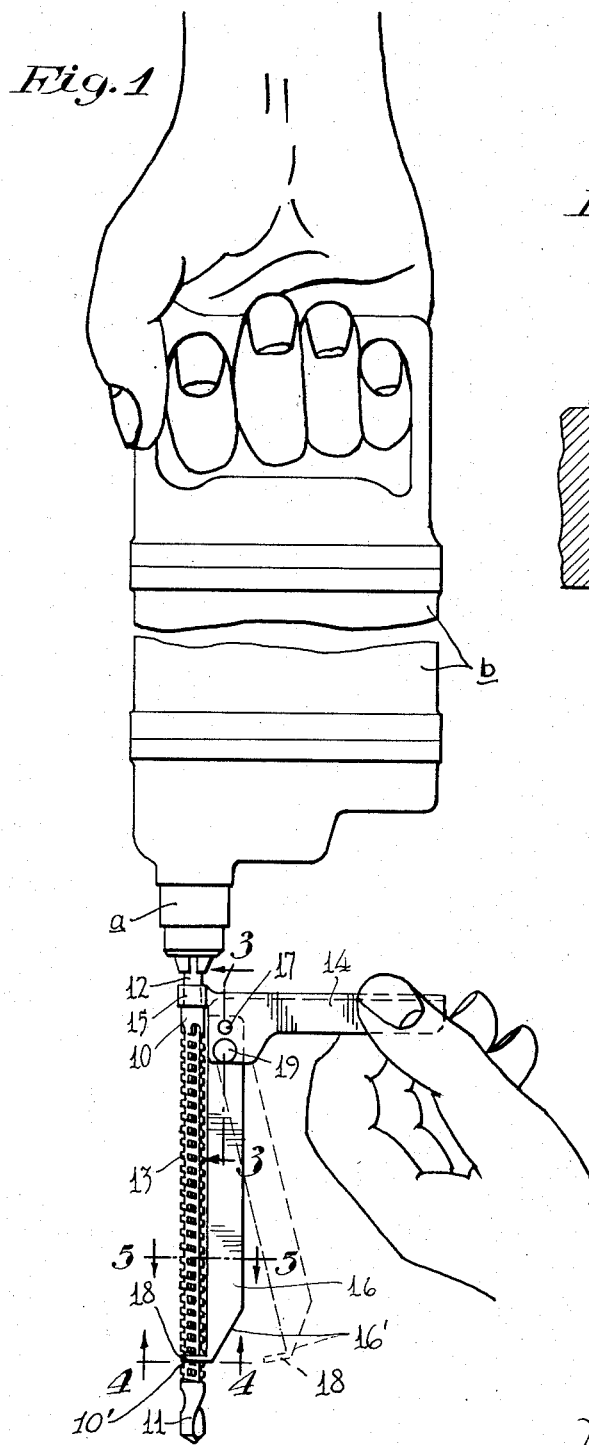
Inventor
Axel H. Burkeman
By his Attorneys April 15, 1941.  A. H. BURKEMAN  2,238,578
AUGER SAW
Filed March 6, 1940  2 Sheets-Sheet 2
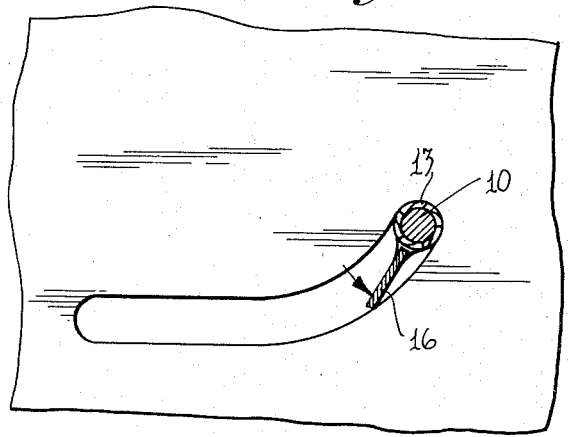
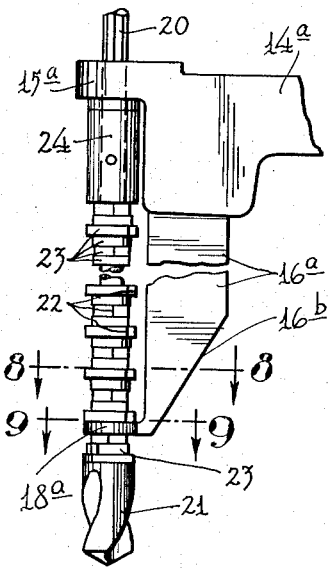
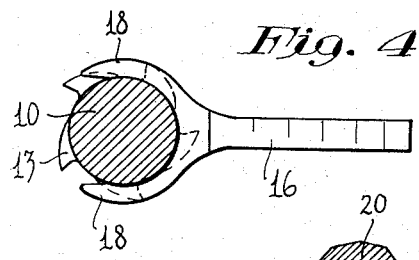
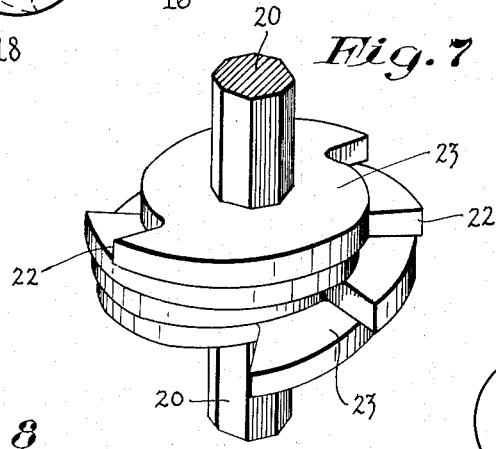
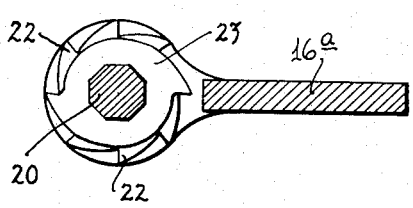
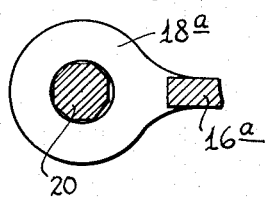
Inventor
Axel H. Burkeman
By his Attorneys
Marchant & Marchant Patented Apr. 15, 1941

2,238,578

UNITED STATES PATENT OFFICE 2,238,578

AUGER SAW

Axel H. Burkeman, Minneapolis, Minn.

Application March 6, 1940, Serial No. 322,526

7 Claims. (Cl. 7—1)

My invention provides an extremely simple and highly efficient device for use in sawing from boards or slabs of material circular, tortuous or straight slots. The device involves a shaft provided at one end with a boring bit and on its body or intermediate portion with radially projecting cutting teeth. The device also involves a handle and a so-called rudder bar applied to the auger shaft in a novel way hereinafter to be described. With this device a hole may first be quickly bored through the plank or board and thereafter by lateral pressure caused to travel in a direction to cut a slot on any desired line either straight or curved; and by the proper manipulation, a large section can be cut entirely out of the body of the board or like object. This improved device, because of the functions that it performs, I designate as an "auger saw." Under axial or endwise pressure, the auger will bore a hole straight through the plank, board, or the like, thereby performing the function of an auger, and under lateral pressure it will have a sawing action.

The invention is illustrated in the accompanying drawings wherein like characters indicate like parts throughout the several views.

Referring to the drawings:

Fig. 1 is an elevation showing the improved auger saw with the auger thereof connected to and arranged to be rotated by the power device such as a pneumatic motor;

Fig. 2 is a view partly in elevation and partly in vertical section illustrating the initial boring action, some parts being broken away;

Fig. 3 is a detail in section taken on the line 3—3 of Fig. 1, some parts being broken away and some parts being removed;

Fig. 4 is a section taken on the line 4—4 of Fig. 1;

Fig. 5 is a view partly in plan looking on the top of a board or like plate and showing also parts sectioned on the line 5—5 of Fig. 1;

Fig. 6 is a side elevation with some parts broken away showing a modified form of the auger shaft;

Fig. 7 is a fragmentary perspective showing some of the parts of the auger shaft illustrated in Fig. 6;

Fig. 8 is a section taken on the line 8—8 of Fig. 6; and

Fig. 9 is a section taken on the line 9—9 of Fig. 6.

The preferred form of the device illustrated in Figs. 1 to 5 inclusive will first be described. In this structure the auger shaft 10, at one end, is provided with a boring bit 11 and at its other end with a reduced portion 12. Between the bit 11 and the reduced end 12, the shaft 10 is provided with axially and circumferentially spaced cutting teeth 13, in this instance formed by first cutting a spiral groove in the body of the shaft 10 and thereafter cutting longitudinal grooves through the screw threads.

To control the operations of the auger, I provide a suitable handle 14 that has a bearing sleeve 15 that is telescoped over the reduced end 12 and in which the latter is rotatively mounted. As shown, this handle 14 is a sheet metal structure folded into U-shaped formation, but which may, of course, take other forms. For the important feature above generally described and hereinafter more fully noted, I provide a long, flat metal bar 16 herein designated as a "rudder bar." The upper end of this bar 16 is inserted between the flanges of the handle or lever 14 and is pivoted thereto at 17. At its lower end, the rudder bar 16 is provided with a fork head 18 that is engageable with a groove cut in the shaft 10, preferably slightly above the bit or boring end 11. Also for the purposes presently to be noted, the lower or free end of the bar 16 is beveled at 16'. For locking the rudder bar 16 in the position shown in Fig. 1 with the forked end 18 engaged with the groove 10' in the shaft 10 (see Fig. 2), I provide a suitable device such as a nut-equipped bolt 19 that is insertable through perforations in the flanges of the handle 14 and through a perforation in the rudder bar 16, as best shown in Fig. 3. By reference particularly to Fig. 5, it will be noted that the rudder-acting bar 16 in transverse thickness is much less than the diameter of the cutting tool or boring auger so that it will not interfere with lateral travelling of the auger even when caused to travel on a straight line.

When the bar 16 is unlocked by removal of the bolt 19, it may be turned out of the way or even up into the handle 14, so that the auger can then be used to bore a simple or straight hole through a board or the like. In fact, if the board is not too thick, the initial boring action can be started with the rudder bar locked in position, as shown by full lines in Figs. 1 and 2. In fact the rudder bar locked in position as stated will not interfere with the axial boring action until the oblique surface 16' engages the wall of the hole being bored and thereafter the downward pressure on the tool will produce an initial lateral or traveling action of the boring tool.

With the rudder bar locked and the tool once inserted through the board, the lateral traveling action of the boring tool must be produced by lateral pressure thereon in the directions that are desired to cut the slot. Under direct lateral pressure the tool will tend to travel more or less accurately straight ahead but the curved line of travel can be varied, and this lateral pressure controlled by pressing on the handle 14 in a direction to cause the rudder bar to engage a wall of the slot. At this point attention is particularly called to Fig. 5 where, by pressing the handle bar 14 in a counter-clockwise direction, the rudder bar will be pressed in a direction of the arrow marked adjacent thereto on said view, and that will tend to cause the lateral advance of the cutting tool in the direction of the curve shown in Fig. 5.

In all these lateral cutting or sawing actions the strain on the auger shaft will, of course, be very considerable and, hence, the importance of the handle and the rudder bar or blade, by means of which the cutting shaft is supported at both ends and capable of withstanding the cutting pressure necessarily put upon the same. In actual practice it has been found that this cutting tool will operate very efficiently in performing the peculiar work noted. It is a very efficient tool for cutting, for example, large round or similar sections out of a flat board or slab.

In Figs. 6, 7, 8 and 9 another form of auger shaft is shown in which the shaft 20 is polygonal and is provided at its boring end with an auger 21. In this structure the axially and circumferentially spaced teeth 22 are formed on metallic discs 23 that are telescoped in close engagement onto the reduced angular shaft 20 and are clamped thereto for rotation therewith against the auger head 21. In this last noted structure the handle 14a is provided with a bearing lug 15a in which the shaft 20 is directly or indirectly journaled. The rudder bar 16a in this structure is rigidly secured to the handle 14a and the said rudder bar, at its lower or extended end, has a complete loop or sleeve 18a in which said shaft 20 is journaled. The shaft 20 is inserted axially through this bearing 18a and through the cutting discs 23 and through the bearing 15a and preferably also through a sleeve 24 that is keyed or pinned onto said sleeve to lock the same against axial movements in respect to the handle structure in which it is mounted. The lower end of rudder bar 16a is also preferably beveled at 16b for reasons already indicated. Preferably, at least one of the cutting discs 23 will be located below the bearing 18a, as best shown in Fig. 6. The boring operation of this tool, as illustrated in Figs. 6 to 9, would be much the same as that described in connection with the earlier described form of the device.

The boring and cutting shaft may be rotated by any suitable means but in the drawings, Fig. 1, it is shown as held in the rotary chuck $a$ of a pneumatic motor $b$.

In the above description of the drawings I have specifically described certain forms of the device, but it will be understood that the same is capable of various other modifications within the scope of the invention herein disclosed and claimed.

What I claim is:

1. In a tool of the kind described, an auger shaft provided at one end with a boring bit and with a body portion having radially projecting cutting teeth, a handle having a bearing in which the upper end of said shaft is journaled, and a rudder bar pivotally connected to said handle and its free lower end having a forked bearing sidewise engageable with the lower portion of said shaft above its bit.

2. The structure defined in claim 1 in further combination with means for locking said rudder bar to said handle in a position in which its forked end is engageable with said shaft.

3. The structure defined in claim 1 in which said handle and rudder bar are on the same side of said auger shaft.

4. The structure defined in claim 1 in which said handle is channel-shaped and to the flanges of which said rudder bar is pivoted for folding movement within the channel of said handle.

5. The structure defined in claim 1 in which said handle is channel-shaped and to the flanges of which said rudder bar is pivoted for folding movement within the channel of said handle, and a bolt insertable through perforations in said flanges and in said rudder bar to lock the latter with its forked end engaged with the extended end of said auger shaft.

6. The structure defined in claim 1 in which the free end of said rudder bar is beveled from its outer edge to its forked end.

7. In a tool of the kind described, an auger shaft provided at its lower end with a boring bit and with a body portion having radially projecting cutting teeth, and a holder having upper and lower portions in which said auger shaft is journaled at points above said bit, said holder having less thickness than the body of said shaft and being offset radially from the latter, and having a projecting handle adapting the same to serve as a rudder for guiding said shaft laterally in the cutting action.

AXEL H. BURKEMAN.